WORD ORGANIZED HIGH SPEED MAGNETIC MEMORY SYSTEM

Filed Aug. 31, 1962 5 Sheets-Sheet 1

INVENTOR.
Richard L. Snyder,
BY.
Walter J. Adam
ATTORNEY.

WORD ORGANIZED HIGH SPEED MAGNETIC MEMORY SYSTEM

Filed Aug. 31, 1962 5 Sheets-Sheet 2

WORD ORGANIZED HIGH SPEED MAGNETIC MEMORY SYSTEM

Filed Aug. 31, 1962 5 Sheets-Sheet 3

*INVENTOR.*
Richard L. Snyder,

*BY.*

Walter J. Adam
*ATTORNEY.*

INVENTOR.
Richard L. Snyder,

BY.

Walter J. Adam
ATTORNEY.

WORD ORGANIZED HIGH SPEED MAGNETIC MEMORY SYSTEM

Filed Aug. 31, 1962 5 Sheets-Sheet 5

INVENTOR.
Richard L. Snyder,

BY.

Walter J. Adam
ATTORNEY.

3,287,710

WORD ORGANIZED HIGH SPEED MAGNETIC MEMORY SYSTEM

Richard Lee Snyder, Malibu, Calif., assignor to Hughes Aircraft Company, Culver City, Calif., a corporation of Delaware Filed Aug. 31, 1962, Ser. No. 222,756
5 Claims. (Cl. 340—174)

This invention relates to magnetic core memory systems and particularly to a simplified high speed word organized core memory system that provides improved operation and is easily constructed by mechanical means.

Conventional memory systems utilize a plurality of magnetic cores arranged in rows and columns with row leads and column leads passing through or coupled to corresponding cores. Selection of the cores storing a desired word is performed by diode logical circuits passing current pulses of a half amplitude of the minimum current amplitude required to switch the cores, through row leads and a selected column lead. The half currents combine during reading and writing at only the cores in the selected column to provide a full amplitude switching current. However, all cores of the array are subjected to a half current pulse to cause undesired noise signals to appear on the sense leads, which noise signals are particularly undesirable during reading. Also, the amplitudes of the half current pulses must be closely adjusted to provide satisfactory operation. Further, in these conventional memory arrays utilizing half amplitude switching currents, the switching time of the cores is relatively slow. Another problem associated with conventional memory systems is that the operating parameters as established by the cores and the switching currents prevent flexibility of design.

A system that utilizes saturating reactors for switching instead of diode logic for selection of word lines and in which the saturating reactors respond to relatively small switching signals would be very advantageous in the computer art. Also a memory system that provides a wide selection of design parameters and is arranged for ease and simplicity of construction such as by weaving machines would allow improved high speed memories to be constructed with a minimum of time and expense.

It is therefore an object of this invention to provide a high speed memory system.

It is a further object of this invention to provide a magnetic memory system that utilizes an improved inductive switching arrangement for selection of magnetic elements.

It is a still further object of this invention to provide a magnetic memory system utilizing a word organized driving arrangement in which the cores are switched with a relatively large current flowing through selected saturated reactors in response to relatively small switching voltages.

It is another object of this invention to provide a core memory array in which the switching current selection ratio is three to one between cores selected to be switched and those not selected to be switched and in which this switching current is controlled by improved saturating reactor arrangements.

It is still another object of this invention to provide an improved and simplified high speed memory system that is adapted for construction with desired parameter relations and that may be constructed with machines such as by spinning.

It is another object of this invention to provide an improved reactive switching element.

Briefly, in accordance with this invention, a simplified and compact word organized memory system is provided with an improved current selection ratio for switching the cores or core elements and with an improved saturating reactor arrangement utilized for word selection. The cores which may be magnetic wire are arranged with a word line or conductor coupled to all cores of each word. Sense and control conductor arrangements are provided with each coupled to the core wires in a selected bit position of each word line. A saturable ferromagnetic wire is wound around each word conductor in the region of the cores to form a saturating sheath. During reading, a full amplitude current pulse equal in amplitude to the normal switching current of the cores is passed through a selected word line with each sense and control conductor having a half amplitude D.C. biasing current passing therethrough so that all cores in a first or "one" state are switched rapidly to the opposite or "zero" state. The switched cores provide high amplitude sense signals in response to the current pulse of three halves normal switching amplitude while all cores in a "zero" state in the selected word line and other cores in the array are substantially undisturbed. During writing, a full amplitude current pulse is passed through the selected word line in the opposite direction from that during reading and which develops a magnetic force opposing that developed by the continuing D.C. bias current. Also a full amplitude write current pulse is passed through sense and control conductors coupled to selected cores in which a "one" is to be written to develop a magnetic force in the same direction as that developed by the current pulse passing through the word line. Thus, selected cores are rapidly switched to the opposite or "one" state, in response to current of three halves normal switching amplitude. To provide selection of the word lines, voltage switching pulses of opposite polarity are applied to opposite ends of only the selected word line to rapidly saturate the selected ferromagnetic sheath and pass the full amplitude current pulses therethrough. Because of the improved arrangement with the ferromagnetic wire wound around the conductor, the switching is performed with relatively small voltage switching pulses and a very small current is passed through the unselected word lines.

The novel features of this invention, as well as the invention itself, both as to its organization and method of operation, will best be understood from the accompanying description, taken in connection with the accompanying drawings, in which like characters refer to like parts and in which.

Figure 1:
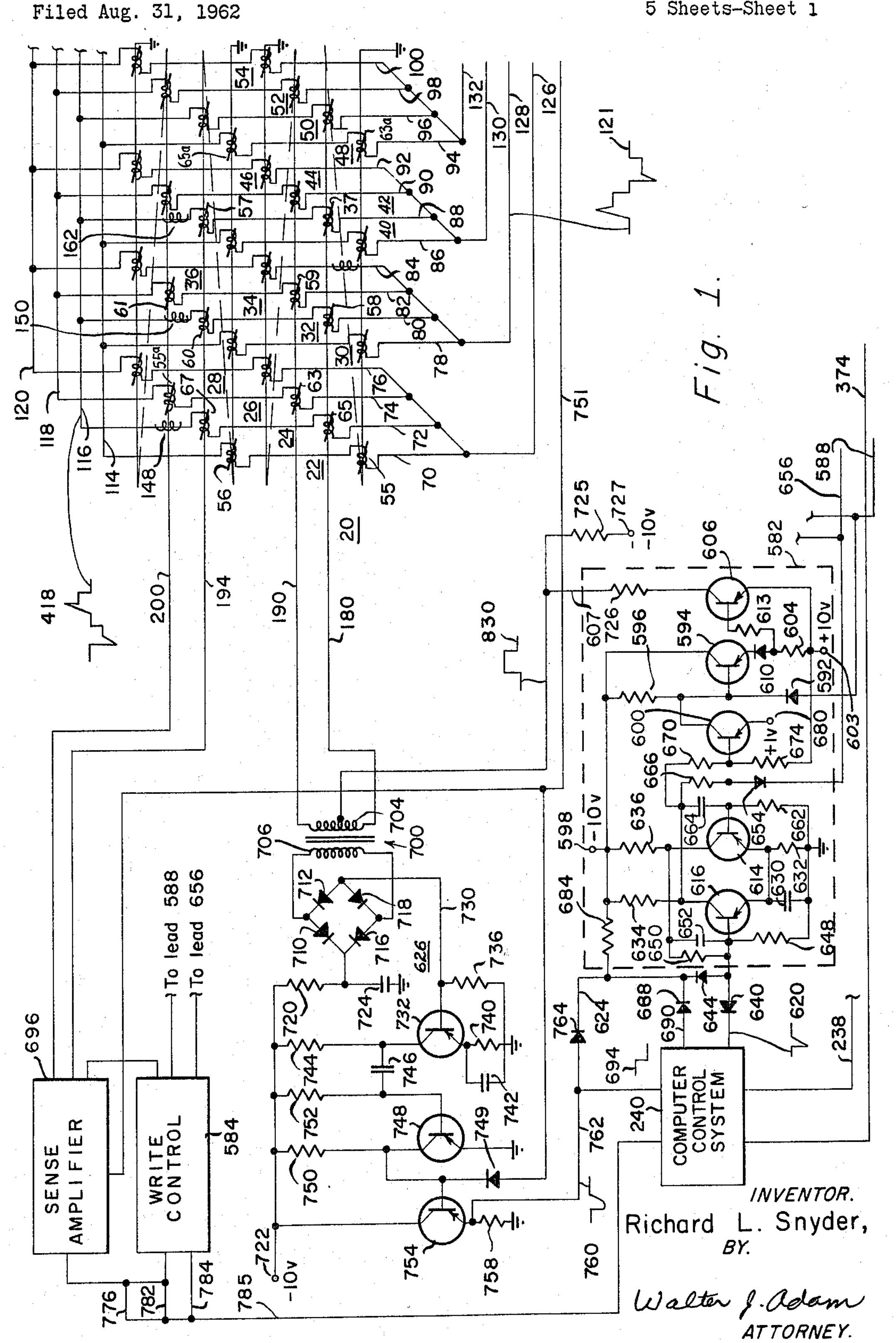
FIG. 1 is a schematic circuit diagram of a first portion of the memory system in accordance with this invention including the memory array, sense amplifier circuits and write control circuits.
Figure 3:
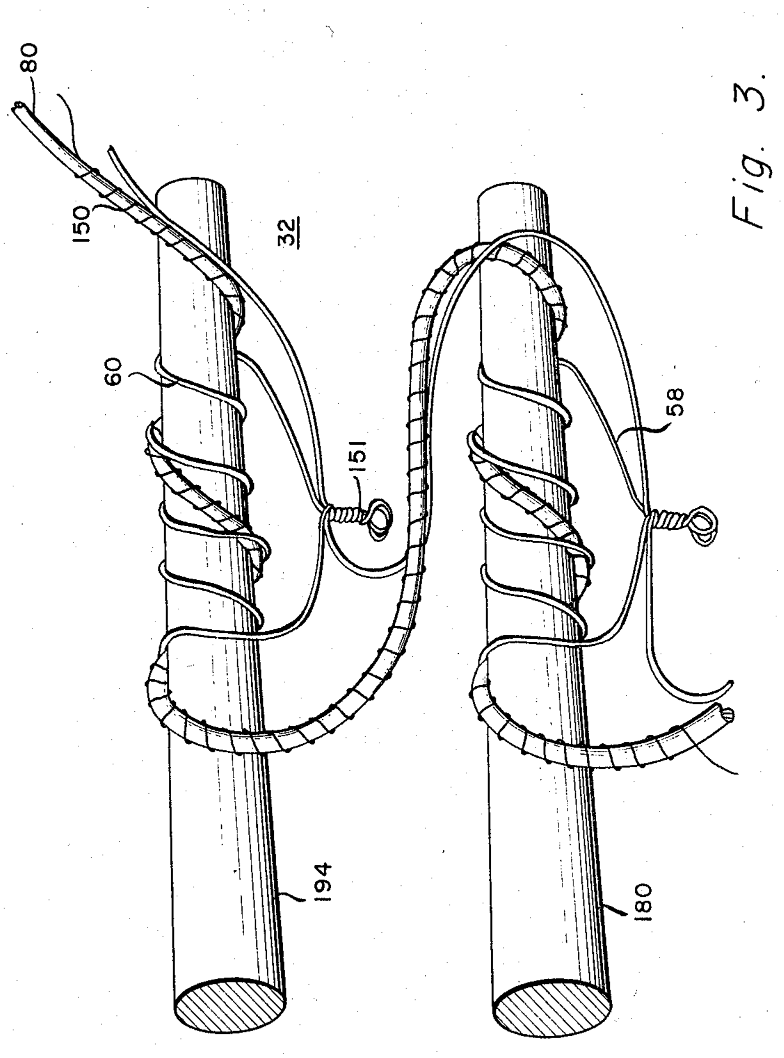
FIG. 3 is a partially perspective drawing of a portion of the memory array of FIG. 1 for further explaining the improved selection system in accordance with this invention.

Referring first to FIG. 1, a memory array 20 includes a plurality of word elements such as 22, 24, 26, 28, 30, 32, 34 and 36 in a first half of the array and a similar number of word elements such as 40, 42, 44, 46, 48, 50, 52 and 54 in a second half of the array. Each word element such as 32 includes two core elements or cores 58 and 60 indicated as a slant line in FIG. 1. The core wires such as 58 and 60 may be seen in FIGS. 3 and 4. The word element 32, for example, includes cores or core wires 58 and 60. The word element 34 includes core elements or cores 59 and 61. Also, the word element 22 may include cores 55 and 56, the word element 42 may include cores 37 and 57 and the word element 48 may include cores 63*a* and 65*a*. The two cores in each word element represent different binary positions of a word. It is to be noted the cores such as 58 and 60 may be formed from several turns of magnetic wire as shown in FIG. 3 or other arrangements in accordance with this invention. Each word element such as 22, 24, 26, 28, 30, 32, 34 and 36 includes respective word lines 70, 72, 74, 76, 78, 80, 82 and 84 with each word line such as 80 magnetically coupled to the corresponding cores such as 58 and 60. The word elements 40, 42, 44, 46, 48, 50, 52 and 54 include respective word lines 86, 88, 90, 92, 94, 96, 98 and 100 with each word line magnetically coupled to the corresponding cores.

Each word line is coupled at one end to column or Y selection leads 114, 116, 118 or 120. The word lines 70, 78, 86, and 94 are coupled to the Y selection lead 114, the word lines 72, 80, 88 and 96 are coupled to the Y selection lead 116, the word lines 74, 82, 90 and 98 are coupled to the Y selection lead 118 and the word lines 76, 84, 92 and 100 are coupled to the Y selection lead 120. The other ends of the word lines are coupled to row or X selection leads 126, 128, 130 or 132. The word lines and corresponding cores may be considered arranged in groups, the word lines 70, 72, 74 and 76 forming one group, for example.

The memory array 20 is shown with two cores or bit positions in each word element for convenience of illustration, but it is to be understood that in accordance with this invention any desired number of bits per word may be provided as well as an array with any desired number of word elements. A sense and control lead 180 which provides a full amplitude current pulse during writing, provides a D.C. bias current and responds to sensed signals, as will be explained subsequently, is magnetically coupled to the core storing the first binary bit such as the core 65, the cores in the corresponding positions of the word elements 32, 42, 50, the core 55 of the word element 22, and the cores of the word elements 30, 40 and 48, being connected thereat to ground. Another sense and control lead 190 is magnetically coupled to the core in the first bit position of each word element such as the core 63 of the word element 26 and the corresponding cores of the word elements 34, 44, 52, 28, 36, 46 and 54 being connected thereat to ground. A sense and control lead 194 is magnetically coupled to the core 67 of the second bit position of the word element 24 and the corresponding cores of the word elements 32, 42, 50, 22, 30, 40 and 48 to ground. Also, a sense and control lead 200 is magnetically coupled to the cores in the second bit position in the first half of the array such as the core 55*a* of the word element 26 and the corresponding cores of the word elements 34, 44, 52, 28, 36, 46, and 54, being connected to ground at that end. It is to be noted at this time that all of the sense and control leads perform the function of conducting a D.C. bias current, of conducting a write current and of responding to interrogation signals from the cores.

Figure 2:
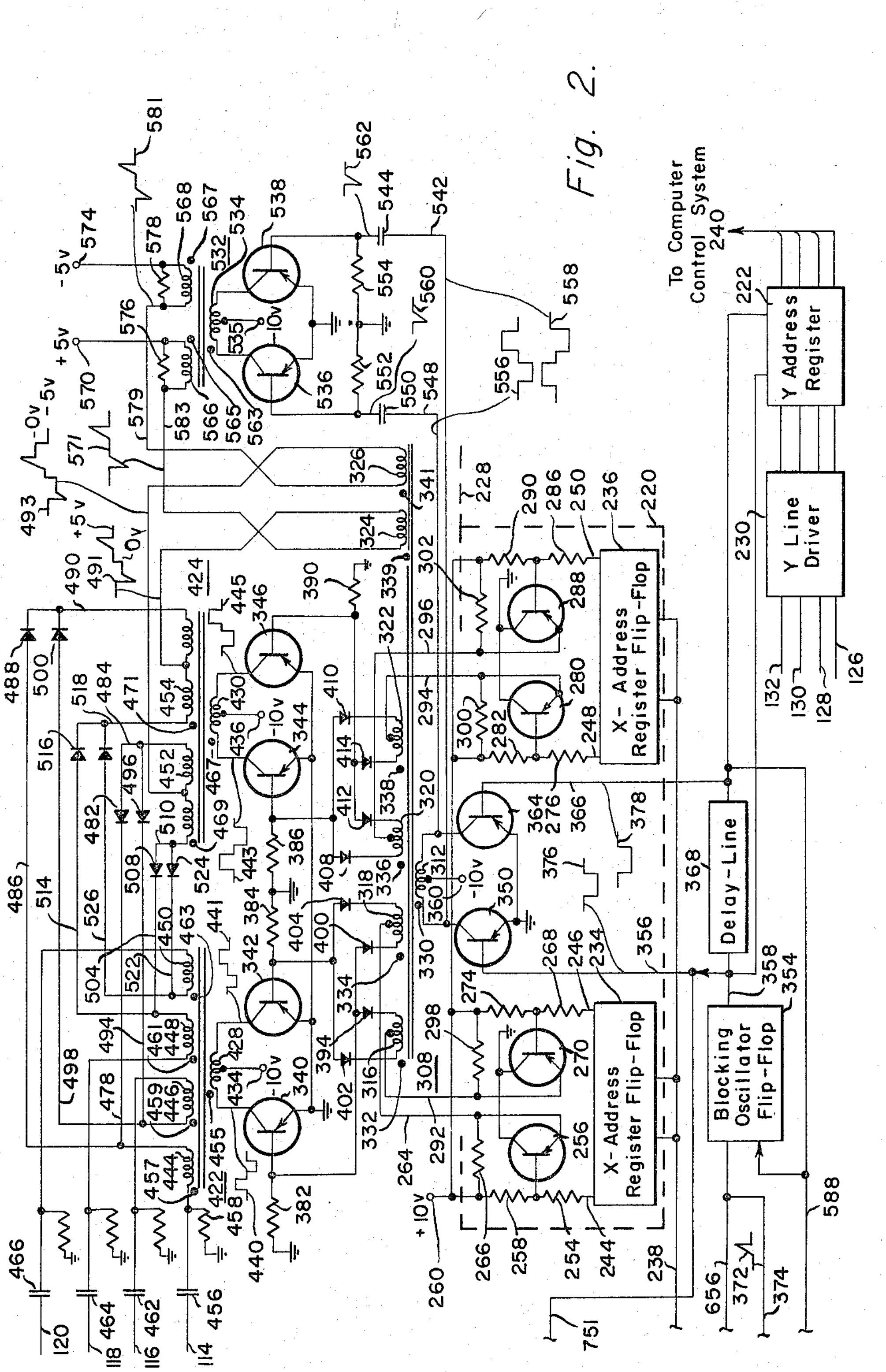
FIG. 2 is a schematic circuit diagram of a second portion of the memory system in accordance with this invention to be connected to FIG. 1 and including address registers and driving circuits.

Before explaining the sense amplifier and the write control circuits in accordance with this invention the pulse forming networks will be explained by referring to FIG. 2. For reading and writing in accordance with this invention, an X address register 220 as shown in FIG. 2 and a Y address register 222 are provided respectively controlling an X line driver circuit 228 and a Y line driver circuit 230 which function as voltage pulse forming networks. The X address register 220 includes first and second flip-flop circuits 234 and 236, each having a first and a second input lead coupled through a plurality of leads indicated as a composite lead 238 to a source of address signals such as a computer control system 240. The flip-flops 234 and 236 respond to input signals to be each set to a first or a second binary state as is well known in the art and apply a signal at a high voltage level and a signal at a low voltage level to different ones of output leads 244 and 246 and output leads 248 and 250.

The lead 244 is coupled through a resistor 254 to the base of a pnp type transistor 256 operating as an emitter follower as well as through a resistor 258 to a suitable source of potential such as a +10 volt terminal 260. The transistor 256 has a collector coupled to ground and an emitter coupled to a lead 264. A resistor 266 may be coupled between the lead 264 and the +10 volt terminal 260. Similarly, the lead 246 is coupled through a resistor 268 to the base of a pnp type transistor 270, operating as an emitter follower, as well as through a resistor 274 to the +10 volt terminal 260. The lead 248 is coupled through a resistor 276 to the base of a pnp type transistor 280 as well as through a resistor 282 to the terminal 260 and the lead 250 is coupled through a resistor 286 to the base of a pnp type transistor 288 as well as through a resistor 290 to the terminal 260. The transistors 280 and 288 also operate as emitter followers. The collector of the transistors 270, 280 and 288 are coupled to ground and the emitters are respectively coupled to leads 292, 294 and 296. Resistors 298, 300 and 302 are provided similar to the resistor 266.

A transformer 308 is provided including a primary winding 312 inductively coupled to a plurality of secondary windings 316, 318, 320, 322, 324, and 326, all wound with a similar polarity relation as indicated by dots 330, 332, 334, 336, 338, 339 and 341. The transformer 308 in response to timing pulses similar to waveforms 376 and 378 applied to the winding 312 biases a transistor 340 or 342 and a transistor 344 or 346 in a sequence as selected by the flip-flops 234 and 236. One end of the winding 312 is coupled to the collector of a pnp type transistor 350 having an emitter coupled to ground and a base coupled to a blocking oscillator 354 through leads 356 and 358. The winding 312 has a center tap coupled to a −10 volt terminal 360 so as to operate in a push-pull arrangement. The other end of the winding 312 is coupled to the collector of a pnp type transistor 364 having an emitter coupled to ground and a base coupled through a lead 366 to a delay line 368.

The read and write timing control of the driving operation is performed by the blocking oscillator 354 responding to an initiate pulse of a waveform 372 applied thereto from the computer control system 240 through a lead 374. The timing signal of the waveform 376 is applied to the lead 356 and a delayed timing signal of a waveform 378 is applied to the lead 366. Selection of a lead such as 128 is performed by the flip-flops 234 and 236 applying a low level or ground potential to the center taps of the windings 316 or 318 and the windings 320 or 322. The reading and writing sequence is controlled by the timing pulse of the waveforms 376 and 378 controlling the transistors 350 and 364 to apply opposite polarity pulses to the ends of the primary winding 312, which in turn determines the polarity relations of the pulses at all secondary windings of the transformer 308.

For selection of the X driving or selection lead, the lead 264 is coupled to the center tap of the secondary winding 318, the lead 292 is coupled to the center tap of the winding 316, the lead 294 is coupled to the center tap of the winding 322 and the lead 296 is coupled to the center tap of the winding 320.

The transistors 340, 342, 344 and 346 all of the pnp type are provided to respond to the selection operation and polarity relation of the pulses applied to the transformer 308. The transistor 340 has an emitter coupled to ground and a base coupled through a bias control resistor 382 to ground, the transistor 342 has an emitter coupled to ground and a base coupled through a bias control resistor 384 to ground, the transistor 344 has an emitter coupled to ground and a base coupled through a bias control resistor 386 to ground and the transistor 346 has an emitter coupled to ground and a base coupled through a bias control resistor 390 to ground. To control the sequence of conduction of the transistors, the base of the transistor 340 is also coupled through the anode to cathode path of a diode 394 to a first end of the winding 316 and through the anode to cathode path of a diode 400 to a first end of the winding 318 and the base of the transistor 342 is also coupled through the anode to cathode path of a diode 402 to the second end of the winding 316 and through the anode to cathode path of a diode 404 to the second end of the winding 318. The base of the transistor 344 is also coupled through the anode to cathode path of a diode 408 to a first end of the winding 320 and through the anode to cathode path of a diode 410 to a first end of the winding 322, and the base of the transistor 346 is coupled through the anode to cathode paths of diodes 412 and 414 to the second ends of respective windings 320 and 322.

A transformer 422 has a primary winding 428 coupled between the collectors of the transistors 340 and 342 and a transformer 424 has a primary winding 430 coupled between the collectors of the transistors 344 and 346. The windings 428 and 430 have center taps coupled to respective suitable sources of potential such as −10 volt terminals 434 and 436 so as to provide a push-pull operation. Thus, when one of the transistors such as 340 is conductive, a positive pulse shown by the first portion of a waveform 440 is applied to the collector of the transistor 340 and a negative pulse as shown by the first portion of a waveform 441 is applied to the collector of the transistor 342, for example. Also, when one of the transistors 344 and 346 is conductive such as the transistor 344, a positive pulse for example shown by the first portion of a waveform 443 is applied to the collector of the transistor 344 and a negative pulse is applied to the collector of the transistor 346 as shown by the first portion of a waveform 445.

Application of a switching pulse to a selected X selection lead also requires the operation of secondary windings 444, 446, 448, and 450 of the transformer 422 and secondary windings 452 and 454 of the transformer 424. The polarity relation of the windings of the transformers 422 and 424 is respectively indicated by dots 455, 457, 459, 461 and 463, and by dots 467, 469, and 471. The winding 444 has a first end coupled through a coupling capacitor 456 to the lead 114 as well as through a biasing resistor 458 to ground. Similarly, the windings 446, 448 and 450 have a first end respectively coupled to respective leads 116, 118 and 120 through coupling capacitors 462, 464, and 466 as well as to ground through biasing resistors similar to the biasing resistor 458. The second end of the winding 444 is coupled to a lead 478 and through the cathode to anode path of a diode 482 to a lead 484 which in turn is coupled to a first end of the winding 452. The second end of the winding 444 is also coupled to a lead 486 and through the anode to cathode path of a diode 488 to a lead 490 which in turn is coupled to a first end of the winding 454. The second end of the winding 446 is coupled to a lead 494 and through the cathode to anode path of a diode 496 to the lead 484 as well as to a lead 498 and through the anode to cathode path of a diode 500 to the lead 490.

The second end of the winding 448 is coupled to a lead 504 which in turn is coupled through the cathode to anode path of a diode 508 to a lead 510 which is coupled to a second end of the winding 452. Also, the second end of the winding 448 is coupled through a lead 514 and the anode to cathode path of a diode 516 to a lead 518 which in turn is coupled to a second end of the winding 454. The second end of the winding 450 is coupled through a lead 522 and the cathode to anode path of a diode 524 to the lead 510 and through a lead 526 and the anode to cathode path of a diode 528 to the lead 518.

For providing an initial spiked portion of the switching pulses such as the waveform 418 to rapidly saturate the reactor in a selected word line of the memory array 20, a transformer 532 is provided with a primary winding 534 having a first and second end coupled to the collectors of respective pnp type transistors 536 and 538, both transistors having emitters coupled to ground. The collector of the transistor 350 is coupled through a lead 542 and a capacitor 544 to the base of the transistor 538 and the collector of the transistor 364 is coupled through a lead 548 and a capacitor 550 to the base of the transistor 536. The bases of the transistors 536 and 538 are also coupled to ground through respective resistors 552 and 554 so that pulses of waveform 556 and 558 are differentiated as shown by waveforms 560 and 562. The winding 534 has a center tap coupled to a suitable source of potential such as −10 volt terminal 535. Secondary windings 566 and 568 of the transformer 532 are provided with a first end of the winding 566 coupled to a +5 volt terminal 570 and a second end coupled through a lead 583 and the reversing winding 324 to a center tap of the winding 454. The winding 568 has a first end coupled to a −5 volt terminal 574 and a second end coupled through a lead 579 and the reversing winding 326 to a center tap of the winding 452. The polarity relations of the primary and secondary windings of the transformer 568 is indicated by dots 563, 565 and 567. Biasing resistors 576 and 578 are coupled between the first and second ends of respective windings 566 and 568.

Spiked pulses of the waveforms 571 and 581 are developed in the leads 579 and 583. The terminals 570 and 574 determine the reference level of the pulses of the waveforms 491 and 493 applied to the center taps of respective windings 454 and 452.

In the system in accordance with this invention, a write control circuit as shown in FIG. 1 is included to provide a reversing current when a binary "one" state is desired to be written into a wire core. The write portion of a cycle occurs during the second pulse such as shown by the positive pulse of the waveform 418. A write control flip-flop circuit 582 controls the cores in the first binary position of a selected word element and a write control circuit 584 controls the core in the second binary position of the selected word element. Because the write control circuits 582 and 584 are similar, only the write control circuit 582 will be described in detail. The delayed timing pulse determining the write portion of the cycle as shown by the waveform 378 (FIG. 2) is applied through a lead 588 to the blocking oscillator 354 as a reset signal and through the anode to cathode path of a diode 592 to the base of a pulse forming transistor 594 of the pnp type. The base of the transistor 594 is coupled both through a resistor 596 to a −10 volt terminal 598 as well as to the collector of a transistor 600. The emitter of the transistor 594 is coupled through a zener diode 610 and a resistor 604 to a +10 volt terminal 603. The zener diode 610 is also coupled through a resistor 613 to the base of a pulse forming transistor 606. The emitter of the transistor 606 is coupled to the terminal 603 and the collector is coupled to the write lead 607 for applying a write pulse of a waveform 830 through the first bit position of each word. The transistors 600 and 606 are all of the pnp type, for example.

The write control circuit 582 also includes transistors 614 and 616 of the pnp type which form a flip-flop circuit that responds to an input signal of a waveform 620 applied to a lead 622 from the computer control system 240 or responds to a recirculating signal applied through a lead 624 from a sense amplifier 626. Also, the flip-flop circuit including the transistors 614 and 616 is reset by the initiate pulse of the waveform 372 applied through a lead 656 and biasing the transistor 614 into conduction. The transistors 614 and 616 have emitters coupled through a parallel arranged capacitor 630 and resistor 632 to ground and collectors coupled to the −10 volt terminal 598 through respective resistors 634 and 636. The base of the transistor 616 is coupled to the lead 622 through the anode to cathode path of a gating diode 640 for responding to information applied from the computer control system 240. The base of the transistor 616 is also coupled to the lead 624 through the anode to cathode path of a gating diode 644 for being triggered into conduction during a regenerative operation. The base of the transistor 616 is further coupled to ground through a resistor 648 and to the collector of the transistor 614 through a parallel arranged resistor 650 and capacitor 652.

The base of the transistor 614 is coupled through the anode to cathode path of a diode 654 and through the lead 656 to the lead 374 (FIG. 1). The base of the transistor 614 is also coupled through a resistor 662 to ground and through resistor 666 to the collector of the transistor 616. To control the transistor 600, the collector of the transistor 616 is coupled through a resistor 670 to the base of the transistor 600 which in turn is coupled to one end of a resistor 674 having the other end coupled to the +10 volt terminal 606. The collector of the transistor 616 is also coupled through a resistor 666 to the diode 654. The emitter of the transistor 600 is coupled to a +1 volt terminal 680 and the collector is coupled to the base of the transistor 594.

In order to provide a regeneration or recirculation gate, the lead 624 is coupled through a resistor 684 to the −10 volt terminal 598 as well as through the cathode to anode path of a diode 688 to a lead 690. A regenerate gating signal at the lower voltage level of a waveform 694 is applied to the lead 690 from the computer control system 240 when the information is to be written into the second bit position of a previously interrogated core as read by the sense amplifier 626.

The sense amplifier 626 for sensing the interrogated signal of the first bit position of a selected word is similar to a sense amplifier 696 for sensing the interrogated signal of the second bit position of a selected word. The sense amplifier 696 is coupled to the sense and control leads 194 and 200 and the sense amplifier 626 is coupled to the sense and control leads 180 and 190. Because both of the sense amplifiers 626 and 696 are similar, only the sense amplifier 626 will be explained in detail. A transformer 700 is provided with a first winding 704 having opposite ends coupled to the leads 180 and 190 and a second winding 706 having a first end coupled to the anode of a diode 710 and to the cathode of a diode 712 and having a second end coupled to the anode of a diode 716 and to the cathode of a diode 718, the diodes forming a full wave bridge rectifier circuit. The cathodes of the diodes 710 and 716 are coupled through a resistor 720 to a suitable source of potential such as a −10 volt terminal 722 as well as to ground through a bypass capacitor 724. This full wave rectifier arrangement is required because sensed signals applied to opposite ends of the winding 704 have opposite polarities. The winding 704 operates in a push-pull manner as a center tap is coupled through a resistor 726 to the lead 607 to respond to the write pulses of the waveform 830 applied from the write control circuit 582. The lead 607 is also coupled through a resistor 725 to a −10 volt terminal 727 to apply a bias current through the winding 704 to the leads 180 and 190. The current flowing from the terminal 727 through the resistor 725 provides, through the sense and control leads 180 and 190, a D.C. (direct current) half amplitude bias current to the cores of the array 20, as will be explained subsequently.

The sensed signal on the leads 180 or 190 is applied from the anodes of the diodes 712 and 718 to a lead 730 and to the base of a pnp type transistor 732. The base of the transistor 732 is coupled to ground through a biasing resistor 736 and the emitter is coupled to ground through a parallel arranged resistor 740 and capacitor 742. The collector of the transistor 732 is coupled through a signal forming resistor 744 to the −10 volt terminal 722 and through a coupling capacitor 746 to the base of a pnp type transistor 748 having an emitter coupled to ground and collector coupled through a resistor 750 to the terminal 722. The base of the transistor 748 is also coupled through the biasing resistor 752 to the terminal 722.

The collector of the transistor 748 is coupled to the base of a pnp type transistor 754 operating as an emitter follower and having an emitter coupled through a signal forming resistor 758 to ground and a collector coupled to the terminal 722. The collector of the transistor 748 is also coupled through the cathode to anode path of a diode 749 to the lead 751 for responding to the read timing signal of the waveform 376. The amplified sense signal as shown by a waveform 760 is applied from the emitter of the transistor 754 through a lead 762 to the computer control system 240 to be utilized therein as is well known in the art. The sensed signal on the lead 762 is also applied through the anode to cathode path of a diode 764 to the lead 624 for rewriting the information into the interrogated core in response to a regenerate signal of the waveform 694.

The sense amplifier 696 has an output lead 776 for applying signals representative of the binary information stored in the second bit position of the selected word to the computer control system 240 through a composite lead 785. A regenerate gate signal is also applied to the write control circuit 584 through a lead 782 and an input signal is applied thereto on a lead 784. The lead 751 is also coupled to the sense amplifier 696 for applying the read timing pulse of the waveform 376 thereto and the leads 588 and 656 are coupled to the write control circuit 584.

Referring now to FIG. 3 as well as to FIG. 1, the arrangement of the storage elements and inductive sheath in accordance with this invention will be explained in further detail. In a memory having a very large number of bits in a word, the high voltage requirements for the core switching may be excessive. For example, in a ferrite core memory utilizing conventional toroid cores, a 68 bit word being read as all "ones" may have a driving voltage requirement of 21 volts and when reading all "zeros" a driving voltage requirement of 1.7 volts. To add sufficient resistance to equalize performance utilizing reactor switching with core or wire around ferrite would require a driving voltage of approximately 500 volts. Thus, in the arrangement in accordance with this invention, the word line 80 has a fine ferromagnetic wire 150 wound therearound in a coil to form a sheath. The number of turns for this wound wire 150 is selected to provide the most desirable sensing voltage and a desirable ratio of the current when switching with a full magnitude switching voltage over the current when switching with a half magnitude switching voltage of the waveform 121. This arrangement provides wide selection of parameters of the core such as 60 and the reactor wire such as 150. In the arrangement in accordance with this invention, a peak switching voltage across the word line of 12.5 volts and a driving peak power of 1.25 watts provides a sensed signal of 20 millivolts, for example. The word line 80 may be wrapped several times around each sense and control line such as 194.

The cores such as 60 may be any suitable ferromagnetic material such as a nickel-iron alloy wire which is wrapped around both the word wire 80 and the sense and control wire such as 194 and when twisted to provide a conection 151. The connection 151 provides a stable mechanical ring and a closed magnetic path to the binary core. The core wire 60 is wound around both the word line 80 and the sense and control line 194. Each of the 32 bits shown in the memory array 20 of FIG. 1 are constructed in a similar manner to that shown in FIG. 3. It is to be noted that the principles in accordance with this invention are applicable to memories having any desired number of words and binary bits per word.

A memory array in accordance with this invention may be constructed by mechanical means by first spinning a very fine iron wire 150 around a relatively small diameter copper wire for the word line 80. This combined word wire 80 and reactor wire 150 is then wound on a bobbin of a loom that weaves it along with the core wire such as 60 in a stitch shown in FIG. 3. The entire array 20 is thus woven in a single operation.

The core wires such as 60 are then twisted such as shown at 151. It is to be noted that the core wire may be continuous between adjacent bits and adjacent words without affecting the operation. The loom that forms the stitches may also make the necessary connections to the row and column wires so that a complete memory array is produced mechanically.

Figure 4:
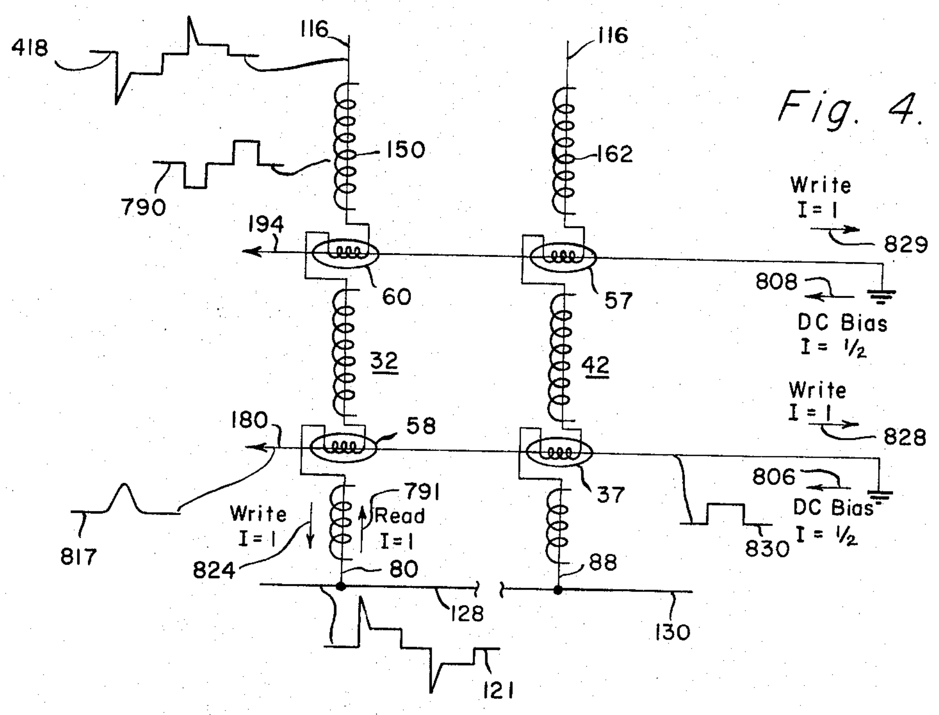
FIG. 4 is a schematic circuit diagram of a portion of the memory array of FIG. 1 for further explaining the current selection ratio and the operation of the saturating reactor arrangements in accordance with this invention.

Referring now to FIG. 4, which is a detail of the word element 32 of FIG. 1, the current selection ratio in accordance with this invention will be first explained. During reading, the first portions including the transient spike portions of the driving pulses of the waveform 418 and of the waveform 121 are applied to the selected respective selection leads 116 and 128 to the word line 80 to initially rapidly saturate the saturating reactor coil 150 and pass a current pulse of a waveform 790 through the word line 80 in a direction indicated by an arrow 791. The unselected saturating reactors such as the coil 162 which have a pulse at a single end thereof or a half voltage thereacross do not saturate in the time period of the reading operation or the writing operation as determined by the width of the respective read and write pulses of the waveforms 418 and 121. As shown in FIG. 1, the reactor coils 148 and 162, as well as similar reactor coils in word lines 78, 82, 84 and 96, all have a half voltage applied to one end when selecting the word element 32, but do not saturate in the time period of the read pulse.

Figure 5:
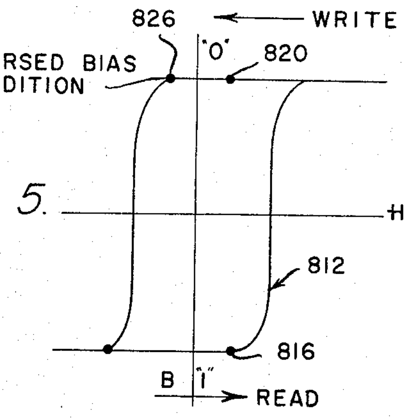
FIG. 5 is a diagram of flux density B versus field H showing the hysteresis loop of the core wires utilized in the system of FIGS. 1 and 2.

In response to the read selection pulses of the waveforms 121 and 418, the cores which are in a binary "one" state at a point 816 of a hysteresis curve 812 of FIG. 5 are switched to the upper level in response to a switching current equal to three halves of the normal switching amplitude. The magnetic forces developed by the current pulse of the waveform 790 indicated by the arrow 791 and the D.C. current of the arrow 806 are in the same direction as that required to produce an opposite state of magnetization. Upon removal of the read pulse, the state of the core moves back to the stable "zero" condition of a point 820 as determined by the magnetic flux developed by the D.C. bias current flowing through the sense and control leads 180, 190, 194 and 200 as indicated by arrows 806 and 808. It is to be noted that during the read cycle a core such as 60 storing a "zero" condition is driven further to the right on the curve 812 from the point 820 but returns to the point 820 at the termination of the pulses of the waveforms 121 and 418. A core in a "one" state such as the core 58 induces a sense signal of a waveform 817 on the sense and control leads such as 180.

During the write portion of the cycle, that is, during the occurence of the negative pulse including the spike of the waveform 121 and the positive pulse including the spike of the waveform 418, the word element such as 32 is again selected by the full voltage applied across the saturating reactor coil 150 which rapidly saturates to pass a current pulse of the waveform 790 therethrough in a direction indicated by an arrow 824. Thus, the cores 58 and 60 are both reverse biased to a point 826 of FIG. 5, the full amplitude current indicated by the arrow 824 effectively overcoming the half current of the D.C. bias currents of the arrows 806 and 808 and moving the magnetic state and equivalent half current distance to the left of the axis. If a "one" is to be written into a core such as 58, a full amplitude write current shown by a waveform 830 is applied in the direction of an arrow 828 to the lead 200 to switch the core to the lower state of the hysteresis curve 812 of FIG. 4. The total switching current is three halves normal amplitude so that the core 58 is rapidly switched to the opposite magnetic state. A similar current pulse is passed through the write lead 190 in the direction indicated by an arrow 829 if a "one" is desired to be written into the core 60. Upon removal of the write current pulse such as that of the waveform 830 and removal of the pulse of the waveform 790, the magnetic state of the core 58 moves to the point 816 of FIG. 5 and a core such as 60 in which a "one" is not written therein returns to the point 820. The magnetomotive force developed by the D.C. bias current indicated by the arrows 806 and 808 maintains the cores 58 and 60 in the magnetic states such as 816 and 820.

The saturating reactor wires such as 150 and 162 have the characteristics that when a relatively large voltage is applied thereacross, they change to a saturated low impedance condition in a very short period of time. The saturation of the reactor from a given remote point on the hysteresis loop requires a fixed number of volt seconds. The saturating reactors which are a coil of ferromagnetic wire to form a sheath saturate in a period of time which decreases with increasing potential applied thereacross. When the saturating reactor 150 is saturated to a low impedance condition during the read portion of the cycle, the read current as shown by the arrow 791 flows through the selected word line 80 to apply magnetic lines of flux to the cores 58 and 60. Similarly, during writing, the full voltage of the combination of selection pulses of the waveforms 418 and 121 rapidly saturates the saturating reactor wire 150.

Figure 7:
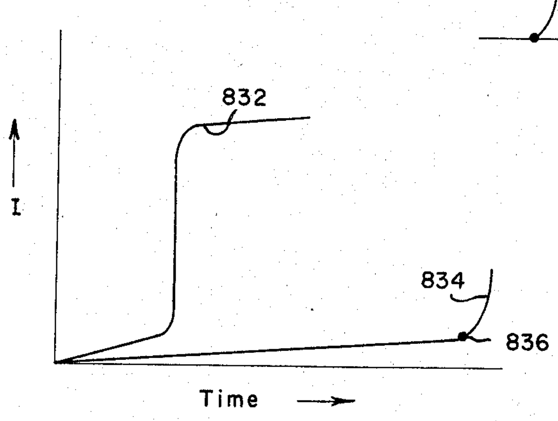
FIG. 7 is a graph of current versus time for further explaining the operation of the saturating reactor switching arrangement in accordance with this invention.

As shown by a curve 832 of FIG. 7, a voltage pulse applied to both ends of a reactor such as the saturating reactor wire 150 causes the current to rise to a relatively large value after a relatively short time interval. The spiked portion of the pulses of the waveforms 121 and 418 causes the selected saturating reactor to rapidly saturate while not providing sufficient voltage to saturate the unselected reactors in the time interval of the total pulse. However, if the voltage pulse is applied to only one end, such as to the saturating reactor 152, a relatively long time interval occurs as shown by a curve 834 before the core is saturated and appreciable current flows therethrough. The reactor switching pulses of the waveforms 121 and 418 are selected of sufficiently short duration so that they are terminated substantially before the current rises above approximately the point 836. This selected time takes into consideration the increased saturation effect of the spiked portions and the steady state portions of the voltage pulses. Thus, only the cores of the selected word element receive sufficient current to even partially overcome the D.C. half current of the arrows 806 and 808. The ferromagnetic sheath arrangement in accordanc e with this invention provides a maximum switching ratio which is defined as the current flowing through the word line at saturation over the current flowing for the unsaturated condition indicated by the small current of the curve 834.

It is to be noted that the pitch of the reactive wire such as 150 may be such that the coils are closely spaced. Thus, the diameter of the central conductor may be a minimum to provide a short magnetic path so that less magnetizing current flows through the unselected word lines. The word line such as 80 is flexible for weaving the memory. It is to be noted that also in accordance with this invention, a plating of ferromagnetic material may be utilized for the reactive element on the core wire such as 80 if a minimum bending is required by the memory arrangements. The saturating reactor wires function in a similar manner during both reading and writing with only the selected reactor such as 150 changing to the saturated low impedance condition during the time duration of the select pulses of the waveforms 121 and 418. All unsaturated reactors are returned to their initial state by the subsequent reading or writing portions of the signal of the waveforms 121 and 418.

Referring now to FIGS. 1 and 2, the general operation of the source of word line selection pulses will be further explained. The address register flip-flops 234 and 236 are initially set by signals applied from the computer control system 240 through the composite lead 238 to the input leads thereof. For example, the flip-flop 234 may be triggered to a state to apply a positive signal to the lead 244 and a negative signal to the lead 246 and the flip-flop 236 may be triggered in a state to apply a negative signal to the lead 248 and a positive signal to the lead 250 with this condition indicated at the flip-flops for convenience of explanation. In this example, as determined by the above states of the flip-flops 234 and 236, pulses of the waveform 418 will be applied to the lead 116. The flip-flop 234 provides selection of either the winding 316 or the winding 318 by applying an essentially ground voltage to the center tap of one or the other. The flip-flop 236 selects either the winding 320 or the winding 322 by also applying an essentially ground voltage to the center tap of one of the two windings. The selected winding 316 or 318, that is the most negative winding, biases the connected diodes either 394 and 402 or 400 and 404 nearly to conduction whereas the diodes connected to the unselected winding are biased sufficiently positive to be far from conduction. By this means the sequence of energizing the transistors 340 and 342 in response to the two pulses of the waveforms 376 and 378 is determined. This sequence combined with those of the other bit positions such as represented by the sequence of energizing the transistors 344 and 346 determine which of the driver secondary windings 444, 446, 448 or 450 conducts during a cycle. The signal developed during the first phase or read phase of the cycle across the selected winding such as 316 acts on the least biased diodes 402 and 394 to bias the diode 400 into conduction and drive the transistor 340 into conduction so that a signal of a selected polarity is developed across the windings 444, 446, 448 and 450. The polarity relation is shown by the pulses of the waveforms 440 and 441 applied to the collectors of respective transistors 340 and 342. During the write portion of the cycle, the transistor 342 is biased into conduction. Similarly, the potential developed across the selected winding 322 in response to the pulses of the waveforms 556 and 558 drives the diode 412 into conduction and in turn the transistor 346 into conduction during the read portion of the cycle to develop a voltage of a selected polarity across the windings 452 and 454. During the write portion of the cycle, the transistor 344 is biased into conduction. The polarity relations developed across the secondary windings of the transformer 422 and the secondary windings of the transformer 424 effectively select during reading and during writing a single one of diodes 488, 500, 516, 528, 482, 496, 508 or 524 for being biased into conduction. However, an additional operation is required by applying a required potential to the center tap of either the winding 452 or 454, which is performed by the action of the transformer 532 and the signal reversal of the windings 324 and 326. This is essentially a dynamic bias which combined with the bias potentials from the terminals 570 and 574 and the spike generated across windings 568 and 566 bring the selected windings 452 or 454 into potentials which will make their connected diodes conduct.

During the read portion of the cycle, the pulses of the waveforms 558 and 556 transferred to the windings 324 and 326 in combination with the pulses of the waveforms 571 and 581 provides a potential to the center tap of the winding 454 as shown by the waveform 491 having a reference level of +5 volts and the negative pulse falling to approximately ground at the steady state portion. A potential is applied to the center tap of the winding 452 as shown by the waveform 493 having a −5 volt reference level and a negative steady state pulse of approximately −10 volts to bias the winding 452 sufficiently negative to prevent conduction of diodes coupled thereto. The differentiated signal of the waveform 560 biased the transistor 536 into conduction to develop the pulses of the waveforms 571 and 581 which are applied to the windings 324 and 326. Because of the arrangement of the secondary windings of the transformers 422 and 424, only the diode 500 is forward biased and goes into conduction. Thus, the signal of the waveform 491 combined with the signal developed across the winding 446 forms the negative portion of the X selection pulse of the waveform 418 on the lead 116.

During the second or write phase of the cycle cited in the example, all transformer secondary voltages reverse. The reversing operation of the windings 324 and 326 combined with the D.C. bias of the terminal 570 establishing the reference level of the waveform 491 biases all of the diodes connected to the winding 454 so far in the reverse direction that they cannot conduct. The positive pulse of the waveform 493 biases the center tap of the winding 452 approximately at ground so that the diodes coupled thereto are close to conduction.

The diode 496 is driven into conduction by the additive voltages on the right side of winding 452 as shown by the pulses of the waveforms 443 and 445 and all of the voltage developed across the winding 446 similar to the pulses of the waveforms 440 and 441. The positive spike of the waveform 581 is applied to the winding 326 as the transistor 538 is biased into conduction in response to the differentiated pulse of the waveform 562. All other diodes are not subject to sufficient forward voltage to cause conduction. Thus, the second pulse or write portion of the pulse 418 is applied to the selection lead 116.

It is to be noted that the system in accordance with this invention may operate without the spike pulses of the waveforms 571 and 581 added to the driving signal of the waveform 418. An essentially square pulse will be formed by the circuit of FIG. 2 if the differentiated pulse is not utilized and the selected saturating reactor will saturate in a relatively short period of time, although not as rapidly as with driving pulses of the waveform 418. The Y address register 222 and the Y line driver 230 simultaneously function in a similar manner to develop the driving signal of the waveform 121 on the selected lead 128.

Figure 6:
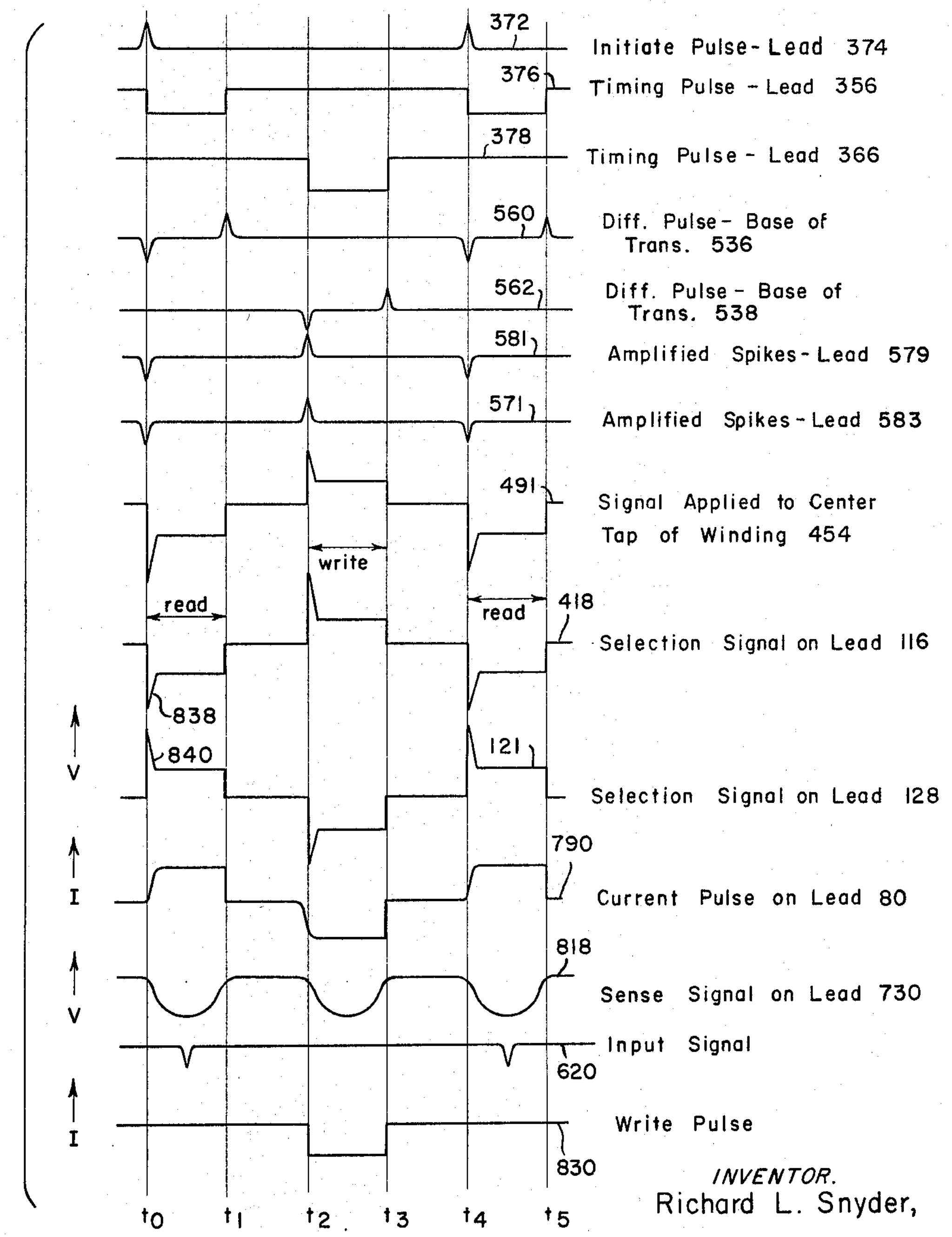
FIG. 6 is a diagram of waveforms as a function of time for explaining the operation of the system of FIGS. 1 and 2 in accordance with this invention.

To generally describe the operation of the sense amplifier 626, the transformer 700 is provided with a center tap coupled through the lead 607 and resistor 725 to the −10 volt terminal 727. The half amplitude D.C. bias current such as indicated by the arrows 806 and 808 of FIG. 3 continually flows from ground through the sense and control leads 180 and 190 and through the winding 704 to the terminal 727. A similar D.C. bias current is applied from ground and through the leads 194 and 200 to the sense amplifier 696. In response to the switching pulses of the waveforms 121 and 418, sense signals induced in the sense and control leads 180 and 190, similar to the waveform 817 of FIG. 3, except of opposite polarity when interrogating words for one of the leads 180 or 190 are applied through the transformer 700 to the full wave rectifier arrangement, including the diodes 710, 716, 712 and 718. A negative signal of the waveform 818 of FIG. 6 is applied through the lead 730 to the base of the transistor 732 which in turn develops a positive signal at the collector thereof, which signal is applied to the base of the transistor 748. In response to the decreased conduction of the transistor 748, a more negative signal is applied to the base of the transistor 754, increasing the conduction thereof and developing a negative going signal of the waveform 760 on the lead 762. Reading is only performed in response to the read timing pulse of the waveform 376 applied from the lead 751 to the anode of the diode 749 to bias that diode out of conduction. The signal of the waveform 760 may be applied to the computer control system 240 to be utilized therein, as is well known in the art. Also, the sensed signal of the waveform 760 may be applied through the diode 764 for being rewritten into the same core. A similar arrangement such as the sense amplifier 696 is provided for each bit position of the word elements.

The writing phase of the operation will now be further described by considering the function of the write control flip-flop circuit 582. The initiate pulse of the waveform 372 applied through the lead 656 to the cathode of the diode 654 biases that diode out of conduction and in turn resets the flip-flop by biasing the transistor 614 into conduction and the transistor 616 out of conduction. This reset condition is the state which will cause the writing of a binary "zero" into a selected core during the write cycle as determined by the timing pulse of the waveform 378. When the transistor 614 goes into conduction, the collector of the transistor 614 goes positive which causes the collector of the transistor 616 to go negative. Because the collector of the non-conductive transistor 616 is negative, the base of the transistor 600 is negative to bias the transistor 600 into conduction and clamp the collector thereof substantially to ground. The base of the emitter follower transistor 594 is therefore at ground potential and will remain so, keeping the write driver transistor 606 biased out of conduction by the action of the zener diode 610. Thus, the passage of a write "one" current through the write conductors such as 200 is prevented.

If the external system or computer control system 240 is to introduce new information, the regenerate gate including the diode 688 will be closed when the gating signal of the waveform 694 is at the upper level, decoupling the diode 644 and allowing information or negative signals for writing a "one" to pass through the diode 640. When a "zero" is to be written into a selected core, a signal such as the waveform 620 is not applied to the input lead 622, so that the diode 640 remains non-conductive and the flip-flop remains in the reset state with the transistor 614 conducting. For writing a binary "one," a negative pulse of the waveform 620 will be applied to the input of the lead 622 shortly after the formation of the initiate pulse of the waveform 372, that is, before the start of the write phase of the operation. The pulse of the waveform 620 is applied through the diode 640 and triggers the write control flip-flop into the "one" state with the transistor 616 biased into conduction and the transistor 614 being biased non-conductive. The collector of the transistor 616 then goes positive, that is, approximately to ground. This condition acting through the resistors 670 and 674 biases the transistor 600 out of conduction allowing the current flowing through the resistor 596 to pass through the diode 592, which is biased at the anode in response to the write timing pulse of the waveform 378 applied to the lead 558. Thus, current flowing through the resistor 596 is allowed to drive the emitter follower transistor 594 into conduction. The write driver or pulse forming transistor 606 is thus biased into conduction passing a write "one" current pulse through the writing conductors 200 and 194 as shown by the waveform 830 of FIG. 3.

When the regenerate gate, including the diode 688, is opened by a signal of the waveform 694 going negative, the diode 644 is biased into conduction and input signals are not applied to the lead 620 as determined by the computer control system 240 so that the diode 640 is biased out of conduction. In this condition, the presence or absence of negative signals of the waveform 760 developed by the sense amplifier 626 controls the write control flip-flop 582 to remain at the reset state to write a "zero" if a "zero" has been read during the read phase of the cycle and to be set to a state to write a "one" if a "one" has been read during the read phase. The presence of the negative signal of the waveform 760 applied to the anode of the diode 644 biases the transistor 616 into conduction to write a "one" similar to that discussed above. Thus, upon application of the write timing pulse of the waveform 378, the transistors 594 and 606 are biased into conduction to pass a write current pulse through the lead 607. A similar operation is performed by the write control flip-flop circuit 584 to apply write control pulses through the leads 194 and 200.

Referring now to the waveforms of FIG. 6, as well as to FIGS. 1 and 2, the operation of the system in accordance with this invention will be explained in further detail by considering the overall timing operation. At a time $t_0$ in response to the initiate pulse of the waveform 372 applied from the computer control system 240, the blocking oscillator 354 is triggered to a state to develop the negative pulse of a waveform 376 on the lead 358. As is well known in the art, after the magnetic elements in the blocking oscillator flop-flop 354 have saturated, the pulse of the waveform 376 is terminated. In response to signals applied from the computer control system 240 through the composite lead 238, the flip-flop 234 and 236 have been set prior to time $t_0$ to binary states for addressing a selected lead 126, 128, 130 or 132. At the same time, similar flip-flops in the Y address register 222 have been set to binary states to address one of the leads 114, 116, 118 or 120.

In response to the timing pulse of the waveform 376, the transistor 350 is biased into conduction and the signals of the waveforms 558 and 556 are applied to the collectors of the respective transistors 350 and 364. Because of the positive signal on the lead 244 and the negative signal on the lead 246 as determined by the state of the flip-flop 234, the emitter follower transistor 270 is biased into conduction to apply the ground potential to the center tap of the winding 316. At the same time, a positive potential is applied to the center tap of the winding 318. Also, in response to the stored state of the flip-flop 236, the transistor 280 is biased into increased conduction to apply a ground potential to the center tap of the winding 322. A positive potential is applied to the center tap of the winding 320.

Also, at time $t_0$ the postive pulse of the waveform 558 and the negative pulse of the waveform 556 respectively applied to the collectors of the transistors 350 and 364 biases the transistor 340 into conduction. The positive and negative pulses of the waveforms 440 and 441 are applied to the collectors of the respective transistors 340 and 342. At the same time, the positive and negative pulses of the respective waveforms 443 and 445 are applied to the collectors of the respective transistors 344 and 346. The sequence of positive and negative pulses during the read and write portions of the cycle at the collectors of the transistors 340 and 342 and of the transistors 344 and 346 is determined by applying the negative potential to the center taps of the windings 316 and 322.

The negative differentiated pulse of the waveform 560 is applied to the base of the transistor 536 at time $t_0$. The transistor 536 is biased into conduction and applies a pulse of the waveform 571 across the winding 324 and a pulse of the waveform 581 across the winding 326. After the inversion of the winding 324, the reference level of the pulse of the waveform 491 is biased at +5 volts and the reference level of the pulse of the waveform 493 is biased at −5 volts, so that only the winding 454 is energized in response to the ground level of the negative pulse. The diode 500 is then biased into conduction. Thus, as previously discussed, the diode 500 is selected to be conductive and in combination with the signal developed across the winding 446 the signal of the waveform 418 is applied to the selection lead 116. It is to be noted that simultaneously a similar pulse of the waveform 121 except positive is being formed by the Y line driver 230 and applied to a selected lead such as 128.

Shortly after time $t_0$ in response to the large negative spike 838 of the waveform 418 and the large positive spike 840 of the waveform 121, the selected saturating reactor coil 150 is rapidly driven into saturation as shown by the curve 832 of FIG. 7, so that a very low impedance is presented to current flowing thereto. Thus, a short period after time $t_0$, a full amplitude current pulse indicated by the waveform 790 flows through the lead 80. In response to the current pulse of the waveform 790, the selected cores which are in a stored binary "one" state are switched to the opposite state to form a sense signal similar to the waveform 818, which for example may be applied to the lead 180. It is to be noted that in other cores such as the core 55 the sensed signal on the lead 180 is inverted from that shown by the waveform 818, but the full wave rectifier of the diodes 710, 712, 716, and 718 applies the negative signal to the lead 730. The cores in the "one" state are switched with a magnetomotive force resulting from three halves of normal switching current. It is to be noted that unselected saturating reactors such as 148, 152, 154, 162, as well as those around word lines 70 and 94, are not saturated by the spikes 838 or 840 or by the steady state half voltage applied thereacross, during the period between times $t_0$ and $t_1$.

At time $t_1$ as controlled by the blocking oscillator 354, the timing pulse of the waveform 376 rises in potential to terminate the pulses of the waveforms 418 and 121. However, the selection of the lead 116 and of the word element 32 does not change because this selection is determined by the binary states of the flip-flops 234 and 236, and similar flip-flops in the Y address register 222.

Between times $t_1$ and $t_2$, a period may be provided for circuit recovery such as discharge of stray capacitance elements. However, it is to be noted that the period between times $t_1$ and $t_2$ may be decreased to a very small amount in accordance with the principles of this invention.

At time $t_2$ which is the start of the write portion of the read and write cycle as determined by the delay time of the delay line 368, the negative signal of the waveform 378 falls in potential to bias the transistor 364 into increased conduction and the transistor 350 into decreased conduction. Thus, the polarity relation across the primary winding 312 is reversed as shown by the waveform 558 and 556. The polarity relation across the windings 316 and 318 and across the windings 320 and 322 are also reversed. The polarity relations across the windings 324 and 326 reverse and in combination with a positive spike of the waveform 581, a positive pulse of the second pulse of the waveform 493 is applied to the center tap of the winding 452. The positive pulse of the waveform 491 is applied to the center tap of the winding 454 to bias all diodes connected thereto non-conductive. Thus, the diode 496 is biased into conduction and in response to a positive signal similar to the positive portion of the waveform 493 combining with the signal across the winding 446, the positive pulse of the waveform 418 is applied to the selection lead 116. As the selecting saturating reactor coil 150 rapidly goes into its saturated low impedance condition, a write select current pulse of the wavefor 790 is applied through the lead 180 in the opposite direction from the previously discussed read current pulse. Thus, the full amplitude current pulse of the waveform 790 overcomes the D.C. bias current and changes the state of all the cores 58 and 60 to the reverse bias condition of the point 826 (FIG. 4). Also, shortly after time $t_2$, the write pulse of the waveform 830 is applied through the sense and control leads 180 and 190, for example, from the write control circuit 582 for writing a "one" into the core 58. The negative pulse of the waveform 620 for writing a binary "one" may be applied from the computer control system 240 to the write control flip-flop circuit 582 between times $t_0$ and $t_1$ so that the write current pulse of the waveform 830 is developed at time $t_2$ in response to the timing pulse of the waveform 378. It is to be noted that the regenerate pulse of the waveform 694 of FIG. 1 may be applied to the diode 688 shortly after time $t_0$ for writing the previously interrogated information back into the memory between times $t_2$ and $t_3$. If a "one" is not desired to be written into the core 60, a write pulse is not applied to the leads 194 and 200, and the negative pulse of the waveform 620 is not applied to the write control circuit 582 between times $t_0$ and $t_1$. Thus, the core in which a "one" is to be written such as the core 58 changes to the lower level of the curve 812 of FIG. 4 and upon removal of the selection current pulse of the waveform 790 and the write pulse of the waveform 830, the core changes to the stable "one" state of the point 816. It is to be noted that writing is performed in only the selected word line 80. A sense signal indicated by the waveform 818 is developed when a "one" is written into a core.

At time $t_3$, the delayed timing pulse of the waveform 378 is terminated and the selection pulses of the waveforms 418 and 121 are terminated. As a result, the selection current of the waveform 790 is also terminated. Because the write timing pulse of the waveform 378 is applied to the diode 592 through the lead 588, the write pulse of the waveform 830 is also terminated at time $t_3$. The period between times $t_0$ and $t_1$, as well as between times $t_2$ and $t_3$, are selected so that the unselected saturating reactor coils such as 152 to which a half potential is applied are unable to saturate and remain in their high impedance condition.

Between times $t_3$ and $t_4$, a period may be provided for circuit recovery and may be relatively short as discussed above. At time $t_4$ in response to the initiate pulse of the waveform 372, the timing pulse of the waveform 376 again falls in potential and is applied to the base of the transistor 350. Similar to the discussion above, the differentiated pulse of the waveform 560 is applied to the base of the transistor 536 to develop the spikes of the waveforms 581 and 571. Thus, driving pulses similar to the waveforms 418 and 121 are applied to the driving leads as selected by the setting of the address register flip-flops 234 and 236, as well as by similar flip-flops in the Y address register 222. It is to be noted that the address register flip-flop such as 234 and 236 may be set between times $t_3$ and $t_4$. The current pulse of the waveform 790 flows through the selected leads such as the word line 80 between times $t_4$ and $t_5$, switching those cores to provide reading of the selected word elements that are storing a binary one. Because the operation proceeds in a similar manner, it will not be explained in further detail.

In the arrangement in accordance with this invention, a large amplitude sense signal results because the sense signal similar to the waveform 818 is a function of the rate of flux change and very rapid switching is provided by the additional switching current. The switching time in normal use of ferrite cores in conventional memories may be 1.2 microseconds while in the arrangement of the invention, the core wire may be switched in less than .2 microsecond, thus providing a relatively high speed of operation.

The system in accordance with this invention has a high degree of flexibility in selection of parameters. With the ferromagnetic wire such as 150 forming a sheath, only a single winding of sheath is required because this most nearly conforms to the conductor surface and the field pattern produced by current therein. The resistance of the central conductor system decreases or the system goes to a higher current range of operation as the diameter of the conducting wire such as 80 increases. It is to be noted that the resistivity aside from the skin effect, decreases as the square of the diameter of the word line conductor increases. The inductance decreases in a linear manner. Thus, in the arrangement in accordance with the invention, the power loss for a given switching ratio decreases with increasing diameter of conducting wire. Increasing the diameter of the word line conductor increases the mean circumference of the magnetic path through the ferromagnetic sheath and decreases the inductance. Thus increased diameter also increases the cross section of the wire 150 causing the switching ratio to remain essentially the same with the range of operating current to be increased. Thus the system in accordance provides a wide flexibility in selecting the desired resistance requirements in the word lines. All of the parameters are easily adjusted to provide the optimum voltage and ampere requirements which may be required by the characteristics of the material used in the memory core such as 60 and the diameter of the sense and control wire such as 194. The inductive switching arrangement in accordance with this invention may also be utilized wherever improved switching is desired and is not to be limited to selection in a memory.

When a core wire is selected having a given coercivity and a nearly rectangular hysteresis loop, the ampere turns per unit length of core wire 60 to provide switching thereof is determined. The diameter of the sense and control lead such as 194 is then selected by considering power dissipation, propagation time and signal attenuation. Therefore the current required to switch the core 60 may be determined by the size of the sense and control lead and of the word line, the coercivity of the core 60 and the number of turns thereof.

In the system in accordance with this invention, the use of fine magnetic wire to form the cores permits the reduction of space along the sense control conductors relative to that required by toroidal cores by such a factor that the propagation time for signals through these conductors may be reduced by nearly an order of magnitude. In addition the reduction in the length of sense and control wires results in either decreased resistance or in the ability to use smaller diameter sense and control wires which will permit a reduction in the circumference of the core and hence lower required switching currents for a material of a given coercivity. Another feature in accordance with this invention is that the distributed saturating reactor switching method integrates the address selection network with the essential conductor array, substantially removing the requirement for an external switch. It is to be noted that in accordance with this invention the core, the sense and control wire and the word wire arrangement may be utilized without the distributed saturating reactor system which may be replaced by other switching means.

The volt seconds required in a word line is determined by the volt seconds required to switch all cores in the entire word line such as 80. The switching ratio which is the ratio of currents at saturation and during an unsaturated condition provided by the sheath of the distributed wire 150 must be sufficiently large to provide a desired current to the selected cores so that they switch before the unselected cores are appreciably disturbed. Also a small current is desirable through the unselected word lines to minimize noise disturbance. The absolute value of the switched and unswitched currents can be controlled by selecting the coercivity of the ferromagnetic wire such as 150 and by selecting the diameter of the conducting wire such as 80. In the core, the volt seconds stored can be adjusted by selecting the diameter of the core wire and the number of turns utilized to form the core. The switching fields required for the core are determined by selection of coercivity of the core and the combined circumference of the sense and control lead such as 190 and the word wire such as 80.

It is to be understood that it is usually necessary to provide for certain minimum mechanical requirements. This system permits a wide range of compensating adjustments to insure a desired operation.

The system in accordance with this invention may be assembled by utilizing specially designed looms. The memory array can be woven as a continuous piece of fabric so that the number of connections required is a minimum.

Thus, there has been described a high speed word organized memory system utilizing an improved current selection ratio and an improved reactive switching arrangement. The word lines included central conductors with a sheath of reactive wire wound therearound as a sheath to form a distributed inductance along the word line having a highly desirable switching ratio and responding to relatively small voltage switching pulses. The cores may be formed by ferromagnetic wire wound around the sense and control conductors and adjacent to the word lines. The arrangement in accordance with this invention allows mechanical weaving techniques to be utilized for memory formation. Also the memory system in accordance with this invention provides a wide variation of parameters for most desirable operation.

What is claimed is:

1. A magnetic memory system comprising a plurality of sense and control leads, a plurality of word leads each coupled to selected ones of said sense and control leads, said word leads including a central conductor and a ferromagnetic wire wound around said conductor substantially the length thereof, a plurality of core elements each including a magnetic wire wound around each of said sense and control leads and said word leads at the coupling of each one of said word leads to said sense and control leads and joined to form an essentially closed magnetic path, first and second sources of switching pulses coupled to opposite ends of the central conductors of said word leads for applying a saturating voltage across a selected word lead to pass a full amplitude read current or write current pulse therethrough, transformer means coupled to said sense and control leads, a source of bias current coupled to said transformer means for applying a direct current bias current through each of said sense and control leads, and a source of writing current coupled to said transformer means for passing current through selected sense and control leads.

2. A magnetic word storage element comprising a plurality of sense and control conductors positioned substantially parallel to each other, a plurality of word conductors each serially wound around each sense and control conductor at a selected position, each of said word conductors having a saturating wire wound therearound, a continuous ferromagnetic wire wound around each word conductor and sense and control conductor at the selected positions thereof, said ferromagnetic wire being twisted together at each sense and control conductor to form an essentially closed magnetic path, a source of pulses of first and second polarity coupled to opposite ends of said word conductors for applying pulses of a selected polarity and amplitude to both ends of a selected word conductor to saturate said saturating wire and apply a full amplitude current pulse through said word conductor, a source of bias current of half amplitude coupled to said sense and control conductors, and a source of writing current pulses of full amplitude coupled to said sense and control conductors, and means for sensing changes of state of said ferromagnetic wire.

3. A system comprising a plurality of word conductors each arranged substantially parallel to each other, a ferromagnetic wire wound around each of said word conductors, a plurality of pairs of control conductors arranged so that one conductor of each pair is adjacent to each word conductor at each of a plurality of bit positions, a plurality of magnetic elements each including magnetic wire wound around the control conductor and the word conductor at each position where one conductor of each pair is adjacent to each word conductor, said magnetic wire wound around said control conductor and said word conductor having characteristics for switching to an opposite magnetic state in response to the magnetic force of a full amplitude current pulse means coupled to both ends of said plurality of word conductors for applying read or write word select voltage pulses to a selected word conductor and saturate the corresponding magnetic wire to pass a full amplitude read or write select current pulse through selected conductor, said read or write select current pulses flowing respectively in a first or a second direction, a plurality of transformers each coupled to one pair of control conductors, a source of bias current coupled to each of said plurality of transformer means for passing a steady state half amplitude bias current through said control conductors, and a source of write current pulses of full amplitude coupled to each of said plurality of transformer means for applying a write current pulse through selected control conductors, one of said read select current pulses and said bias current providing a combined magnetic force developed from a three halves amplitude current to switch all magnetic elements of a selected word conductor in a first magnetic state to a second magnetic state, one of said write select current pulses, said bias current and said write current pulse applied to a selected pair of control conductors providing a combined magnetic force developed from a three halves amplitude current to switch magnetic elements coupled to said selected control conductors in a selected word conductor in said second magnetic state to said first magnetic state.

4. A system for storing a plurality of words each including a plurality of binary bits comprising a plurality of word conductors each arranged substantially parallel to each other, a ferromagnetic wire wound around each of said plurality of word conductors, a plurality of first and second sense and control conductors, said first and second sense and control conductors arranged so that each word conductor is wound around one of said first and second sense and control conductors at each of a plurality of bit positions, a magnetic element including a magnetic wire wound around said sense and control conductor and said word conductor at each winding of said word conductors, said magnetic wire joined at each magnetic element to form an essentially closed magnetic path, said magnetic wire having characteristics for changing magnetic state in response to a magnetic force developed from a first amplitude current pulse, means coupled to both ends of said plurality of first conductors for applying read or write select voltage pulses to both ends of a selected word conductor to saturate said corresponding ferromagnetic wire and apply a full amplitude read or write select current pulse through said selected word conductor, said read and write select current pulses flowing in opposite directions, a plurality of transformers each having first and second windings with opposite ends of each of said first windings coupled to different first and second control conductors, a source of bias current coupled to a center tap of each of said first windings for passing a steady state half amplitude bias current therethrough, and a source of write current pulses of full amplitude coupled to each of said center taps for applying a write current pulse through selected sense and control conductors, one of said read select current pulses and said bias current providing a combined magnetic force developed from a three halves amplitude current to switch all magnetic elements of a selected word conductor in a first magnetic state to a second magnetic state, one of said write select current pulses, said bias current and said write current pulse applied to a selected pair of control conductors providing a combined magnetic force developed from a three halves amplitude current to switch magnetic elements coupled to said selected control conductors in a selected word conductor in said second magnetic state to said first magnetic state to form sense signals in said sense and control conductors, and a plurality of sensing means each coupled to the second winding of a different transformer to respond to said sense signals.

5. A magnetic memory system comprising a plurality of control leads, a plurality of word leads each coupled to said plurality of control leads, said word leads each including a central conductor and a magnetic wire wound around said conductor, a plurality of core elements each including a magnetic wire wound around said control leads and said word leads at the couplings of each one of said word leads to said control leads, first and second sources of switching pulses coupled to first and second ends of the central conductors of said word leads to apply a first pulse to the first ends of a plurality of central conductors and a second pulse to the second end of a selected one of said central conductors to saturate the magnetic wire wound therearound and pass a full amplitude current pulse therethrough, said first and second pulses being of opposite polarity selected to pass current pulses through a selected central conductor in a first direction for reading from core elements coupled to said selected conductor and in a second direction for writing into said core elements, a source of bias current coupled to said control conductors for passing half amplitude current pulses therethrough developing a field for combining with the field of said first current pulse during reading and subtracting from the field of said second current pulse during writing, a source of writing current pulses of full amplitude coupled to said control leads for developing a field to combine with the field of said second pulse during writing, and means coupled to said control leads for responding to the change of state of said core elements during reading.

References Cited by the Examiner

UNITED STATES PATENTS

| | | | |
|---|---|---|---|
| 3,067,408 | 12/1962 | Barrett | 340—174 |
| 3,083,353 | 3/1963 | Bobeck | 340—174 |

BERNARD KONICK, *Primary Examiner.*

JAMES W. MOFFITT, IRVING SRAGOW, *Examiners.*